Patented Apr. 8, 1924.

1,489,497

UNITED STATES PATENT OFFICE.

ALFRED T. LARSON, OF WASHINGTON, DISTRICT OF COLUMBIA, ASSIGNOR TO ARTHUR B. LAMB, TRUSTEE, OF CAMBRIDGE, MASSACHUSETTS.

CATALYST.

No Drawing.  Application filed July 8, 1922. Serial No. 573,741.

*To all whom it may concern:*

Be it known that I, ALFRED T. LARSON, a citizen of the United States, residing in Washington, District of Columbia, have invented new and useful Improvements in Catalysts, of which the following is a specification.

My invention relates to catalysts or substances for causing chemical reactions or combinations to take place by what is known as their catalytic action or effect. Instances of such combinations or reactions are the combination of nitrogen and hydrogen to produce ammonia, the combination of sulphur dioxide and oxygen to produce sulphuric anhydride for sulphuric acid manufacture and other purposes, or the water gas reaction between steam and carbon monoxide, etc.

Practical experience with catalysts has shown that certain substances either present therein, or when added thereto, greatly modify their catalytic power or effect. Certain of such substances are known to greatly interfere with and diminish the power or activity of the catalyst and such substances are known as "poisons." Other substances have been found to increase the power or activity of the catalyst, or to prevent deterioration of that power or activity, or to maintain the catalyst in active condition for longer periods of time than it would otherwise be effective. These latter substances are generally called "promoters."

My present invention has more especially to do with promoters for catalysts, although it also includes the catalyst or catalytic material itself of which said so-called promotors form a constituent part.

The object of my invention is to provide new and improved catalytic material, and methods of producing the same, having increased catalytic activity or power, or that maintains its catalytic power or activity over considerably longer periods of time than catalytic material of which I am at present aware.

My present application is a continuation in part of my pending application Serial No. 449,521, filed March 3, 1921.

For the purpose of illustrating my invention, but not as limiting the same, I will describe my invention with reference to iron as a catalyst, particularly when used in the synthetic production of ammonia, by causing combination or reaction to take place between nitrogen and hydrogen brought in contact therewith. It will be understood that other materials than iron may be employed for the main catalytic material, such for example as cobalt, nickel, platinum, etc. Various additions to the iron or similar catalyst have been proposed from time to time as so-called promoters. For example, oxides of most of the metals have been suggested as additions to iron catalysts as promoters. My experiments have demonstrated, however, that the indiscriminate addition of such so-called promoters to an iron catalyst, not only does not produce a material having any improved catalytic property or activity, but in many cases the reverse effect follows such additions. For example: If such closely chemically-related oxides, as sodium and potassium oxides be added to iron or iron oxide, and such mixture reduced in an atmosphere of hydrogen, the resulting catalytic material does not have any superior or improved catalytic qualities imparted thereto by such additions. Also, my experiments show that when barium and strontium oxides are added to this same catalyst, or also cerium and thorium oxides are added thereto, in either case no marked improvement in the catalytic properties or activity of the iron results.

I have discovered, however, what I consider to be a principle for determining the character or kind of promoters or promotive constituents, which, when added to, combined with, or present in substances having catalytic properties, will materially improve or increase those properties or prolong the activity of the same over greater periods of time with corresponding increase of the yield or product of the reaction for which the catalyst is employed.

The principle of my invention consists in providing a catalytic material that will contain two elements, or their compounds, such as the oxides of said elements, that are mutually related one to the other as electro-positive and electro-negative, or as respectively basic and acidic. For example, with iron as the main catalytic agent, or considered as the catalyst proper, I add thereto or combine therewith at least two elements or their compounds that are related one to the other as respectively basic and acidic in character. Such addition may be regarded as a multi-component, or composite, promoter of the iron catalyst, the combination or mixture of the iron and such composite promoter forming a new and superior catalytic material. As a more specific illustration, when a markedly basic oxide, such as cerium or potassium oxide and an oxide markedly acidic with respect thereto, such as silicon oxide, or aluminum oxide are added to iron oxide and when such mixture is reduced in hydrogen at a low temperature, say below 600° C., a catalytic material is obtained having improved and prolonged catalytic power or effect well suited for the production of ammonia. The basic elements and their oxides and compounds to which I refer include the alkali metals, the alkaline earth metals, and the rare earth metals. The acidic elements and their oxides and compounds to which I refer include principally aluminum and silicon, although other acidic elements, their oxides and compounds, may be employed provided they are not catalyst poisons or have not a poisonous effect on the catalyst. Of such acidic elements, I have found that either aluminum or silicon in combination with one or other of the basic elements mentioned give the most advantageous and satisfactory results.

My invention is not limited to the use of a single basic element or compound with a single acidic element or compound to form the composite promoter, for I have found that a plurality of basic elements or compounds may be added to a single acidic element or compound, and vice versa, or a plurality of each of said acidic and basic constituents may be employed with good results.

Also the catalyst proper may consist of a plurality of catalytic metals instead of a single metal or element. Furthermore, the materials employed for my catalysts may be either the oxides themselves, the metals or elements which become oxidized when heated in an oxidizing atmosphere, or compounds of metals or elements, such as hydroxides, carbonates, nitrates, organic compounds, etc., which on heating at high temperature will be converted to the oxides. Compounds, both artificial and naturally occuring, which contain two or more of the components desired, or substances which on heating at high temperatures will change over into these components may also be employed.

In preparing my catalyst or catalytic material, the composite promoter above described may constitute from about 0.5 to 12 per cent by weight of the total oxides, the remainder being an oxide or oxides of those metals which of themselves have catalytic activity and constitute the catalytic agent or catalyst proper. I have found that, in general, the best results are obtained when the composite promoter or promotive constituents is from 1 to 4 per cent of the total mixture or compound. The respective proportions of the basic and acidic ingredients or components of the promoter itself may also be varied to suit circumstances and conditions. For example, the basic ingredient may constitute from .25 to 2 per cent of the total catalytic mixture or compound; and the acidic ingredient or component may constitute from .25 to 10 per cent of the same. Where the prepared catalytic material is to be used for the production of ammonia and the catalytic agent employed is iron, the preferable proportions of the promoter components to the whole mass before being subjected to reduction as explained are from 0.5 to 1% of the basic components (calculated as oxide) and from 0.5 to 3% of the acidic component (calculated as oxide).

The following specific examples are given to illustrate the preparation of my catalysts or catalytic material:

*Example 1.*—Melt iron in a current of oxygen so that molten iron oxide is formed or else melt iron oxide. Into this molten iron oxide stir a mixture consisting of approximately 1 per cent of sodium or potassium oxide and approximately 1 per cent of aluminum oxide or silicon dioxide. The total weight of the promoter mixture is thus approximately 2 per cent of the total weight of the mass of the catalyst or catalytic material. It will be understood that these respective proportions may be varied in accordance with the ranges indicated above; but when an iron catalytic agent is employed and ammonia is the product to be obtained, I have found that the proportions just specified give a catalyst or catalytic material that in general produce the most satisfactory result. The mass prepared as stated is allowed to cool and then broken into small pieces.

*Example 2.*—The process is followed as in Example 1, but strontium oxide or calcium oxide is used for the basic constituent of the promoter instead of the hydroxides of sodium or potassium. The multi-component promoter should be about 2 to 3 per cent of the total weight of the mixed oxides.

*Example 3.*—Filter freshly precipitated iron hydroxide. Place the precipitate in a kneading machine or similar device and add about 2 per cent by weight of sodium or potassium aluminate or sodium or potassium silicate. After thorough mixing, filter if necessary, and then slowly dry the oxides. Break into small pieces as in Example 1.

*Example 4.*—Melt iron oxide and add thereto about 2 per cent of orthoclase. Allow to cool and treat as in Example 1.

When the catalytic material prepared according to the foregoing examples is to be used for the synthetic production of ammonia, said material is reduced with hydrogen, or with a mixture of nitrogen and hydrogen, or with ammonia or other reducing agent, the reducing gases being free from catalyst poisons. The initial stages of the reduction should preferably be at a relatively low temperature, approximately 300° to 400° C. The temperature of reduction is then slowly increased until that temperature at which it is proposed to conduct the catalytic reaction has been reached.

For carrying out the synthetic production of ammonia by means of the catalytic material described, a current of gas containing three volumes of hydrogen and one volume of nitrogen is passed through said catalytic material, while maintaining a temperature of about 400° to 550° C., the gas being at atmospheric or greater pressure.

When a plurality of oxides or catalytic metals are used in lieu of iron oxide, and the metals are heated to produce the oxides, alloys of the metals as well as mixtures of the metals may be melted and oxidized.

In preparing the catalytic material described, care should be taken to exclude those substances that tend to poison the catalyst. Among such substances having a poisoning tendency are fluorine, chlorine, bromine, iodine, sulphur, selenium, tellurium, phosphorus, arsenic, antimony, bismuth, lead, tin and boron, and compounds containing the same.

For some reactions, such as the water gas reaction, a non-reduced catalyst is desired. In such cases the reduction steps, as set forth above, are dispensed with and the prepared oxide is used.

This invention is not limited to the specific details set forth in the foregoing examples which are to be understood as illustrative and not by way of limitation, since many changes and modifications may be made therein without departing from the principles of the invention.

What I claim is:

1. A catalytic material comprising a substance having catalytic properties and a composite promoter, said catalytic substance consisting of a compound of iron and said composite promoter comprising an element of basic character and an element of acidic character with respect thereto and free from catalyst poisons.

2. A catalytic material consisting of iron oxide and a composite promoter, said composite promoter comprising a compound of an alkali metal and aluminum oxide and free from catalyst poisons.

3. A catalytic material consisting of iron oxide and a composite promoter, said composite promoter comprising 0.25 to 2% of potassium oxide and 0.25 to 10% of aluminum oxide, and free from catalyst poisons.

4. An active catalyst consisting of iron and a composite promoter in combination therewith, said composite promoter being free from catalyst poisons and comprising a compound of an element of basic character and a compound of an element of acidic character with respect thereto.

5. An active catalyst consisting of iron and a composite promoter, said composite promoter being free from catalyst poisons and containing a compound of an alkali metal and an oxide of aluminum.

6. An active catalyst consisting of iron and a composite promoter, said composite promoter being free from catalyst poisons and comprising potassium oxide and aluminum oxide.

7. An active catalyst consisting of iron and a composite promoter therefor, said composite promoter being free from catalyst poisons and comprising a compound of an element having basic character and a compound of an element having acidic character with respect thereto, the basic constituent being in the proportion of from 0.25 to 2 per cent and the acidic constituent being in the proportion of from 0.25 to 10 per cent by weight of the total catalytic material, calculated as oxides.

8. An active catalyst comprising iron and a composite promoter therefor, said composite promoter being free from catalyst poisons and comprising a compound of an element having basic character and a compound of an element having acidic character with respect thereto, the basic constituent being in the proportion of from 0.5 to 1 per cent and the acidic constituent being in the proportion of from 0.5 to 3 per cent by weight of the total catalytic material, calculated as oxides.

9. An active catalyst comprising an element having catalytic properties and a composite promoter therefor, said composite promoter being free from catalyst poisons and comprising a constituent having a basic character and a constituent having an acidic character with respect thereto, the basic constituent being in the proportion of from 0.5 to 1 per cent and the acidic constituent being in the proportion of from 0.5 to 3 per cent by weight of the total catalytic material, calculated as oxides.

10. An active catalyst comprising an element having catalytic properties and a composite promoter free from catalyst poisons and comprising 0.5 to 1 per cent by weight of potassium oxide and 0.5 to 3 per cent by weight of aluminum oxide.

11. An active catalyst for the manufacture of ammonia from its elements, said catalyst consisting of the reduction product of a mixture composed of iron oxide and a composite promoter comprising aluminum oxide and potassium oxide, and free from catalyst poisons.

12. An active catalyst for the manufacture of ammonia from its elements consisting of iron and a composite promoter free from catalyst poisons and comprising an alkali metal oxide and aluminum oxide.

13. An active catalyst for the manufacture of ammonia from its elements consisting of 98% of iron, 1% of potassium oxide and 1% of aluminum oxide.

14. A process for producing a catalyst material which comprises melting together an oxide of an element having catalytic properties and a mixture containing ingredients respectively related one to another as basic and acidic, and free from catalyst poisons, allowing the mass to cool and breaking the same into suitably sized fragments for use.

15. A process for producing a catalytic material which comprises melting together iron oxide and a composite promoter free from catalyst poisons and comprising a compound of an element having basic character and a compound of an element having acidic character with respect thereto, the basic constituent being in the proportion of from 0.25 to 2 per cent and the acidic constituent being in the proportion of from 0.25 to 10 per cent by weight of the total catalytic material, calculated as oxides, allowing the mass to cool and breaking the same into suitably sized fragments for use.

16. A process for producing a catalytic material which comprises melting together iron oxide and a composite promoter comprising potassium oxide and aluminum oxide, the potassium oxide being in the proportion of from 0.25 to 2 per cent and the aluminum oxide being in the proportion of from 0.25 to 10 per cent by weight of the total catalytic material, allowing the mass to cool and breaking the same into suitably sized fragments for use.

17. A process for producing an active catalyst for the manufacture of ammonia from its elements which comprises melting together iron oxide and a composite promoter comprising potassium hydroxide and aluminum oxide, the potassium hydroxide being in the proportion of from 0.25 to 2 per cent calculated as oxide, and the aluminum oxide being in the proportion of from 0.25 to 10 per cent by weight of the total catalytic material, allowing the mass to cool, breaking the same into suitably sized fragments for use, and reducing the fragments with hydrogen at a temperature of 300° to 600° C.

ALFRED T. LARSON.